United States Patent [19]

Lindsey et al.

[11] 4,129,287

[45] Dec. 12, 1978

[54] STRINGING BLOCK ASSEMBLY ADAPTED TO BE THREADED BY HELICOPTER

[76] Inventors: Keith E. Lindsey, 110 El Nida, Pasadena, Calif. 91107; L. E. Lindsey, 2262 E. Mountain, Pasadena, Calif. 91104

[21] Appl. No.: 512,005

[22] Filed: Oct. 4, 1974

Related U.S. Application Data

[63] Continuation of Ser. No. 282,430, Aug. 21, 1972, abandoned.

[51] Int. Cl.² .............................................. B66D 1/36
[52] U.S. Cl. ...................... 254/134.3 PA; 254/193; 254/197
[58] Field of Search .............. 254/134.3 PA, 192, 193, 254/197, 190, 134.3 R

[56] References Cited

U.S. PATENT DOCUMENTS

| | | | |
|---|---|---|---|
| 2,527,651 | 10/1950 | Pieper | 254/134.3 PA |
| 2,806,380 | 9/1957 | Martin | 254/134.3 PA |
| 3,077,337 | 2/1963 | Cronkright | 254/134.3 PA |
| 3,195,862 | 7/1965 | Sherman | 254/197 |
| 3,199,840 | 8/1965 | Lindsey | 254/134.3 PA |
| 3,479,014 | 11/1969 | Reilly et al. | 254/193 |
| 3,837,623 | 9/1974 | Chadwick | 254/134.3 PA |

*Primary Examiner*—Robert C. Watson
*Attorney, Agent, or Firm*—Sellers & Brace

[57] ABSTRACT

A conductor stringing block adapted to be threaded with a hauling line dropped by helicopter and having a suspension yoke connected at its ends to the opposite sides of the block frame. The yoke includes a threading passage which is normally closed by a latch effective to transmit load forces crosswire of the passage. The upper end of the threading passage is equipped with an outwardly and upwardly inclined extension to receive and feed a helicopter-dispensed hauling line into the passage. Upright extensions projecting downwardly from the lower end of the passage flex to pass a power line running board and guide the hauling line as it drops from the threading passage onto an underlying sheave of the stringing block. The yoke assembly is securable crosswise of the upper end of a conventional stringing block in lieu of the conventional suspension yoke thereby converting the conventional block to use with helicopter threading equipment.

68 Claims, 7 Drawing Figures

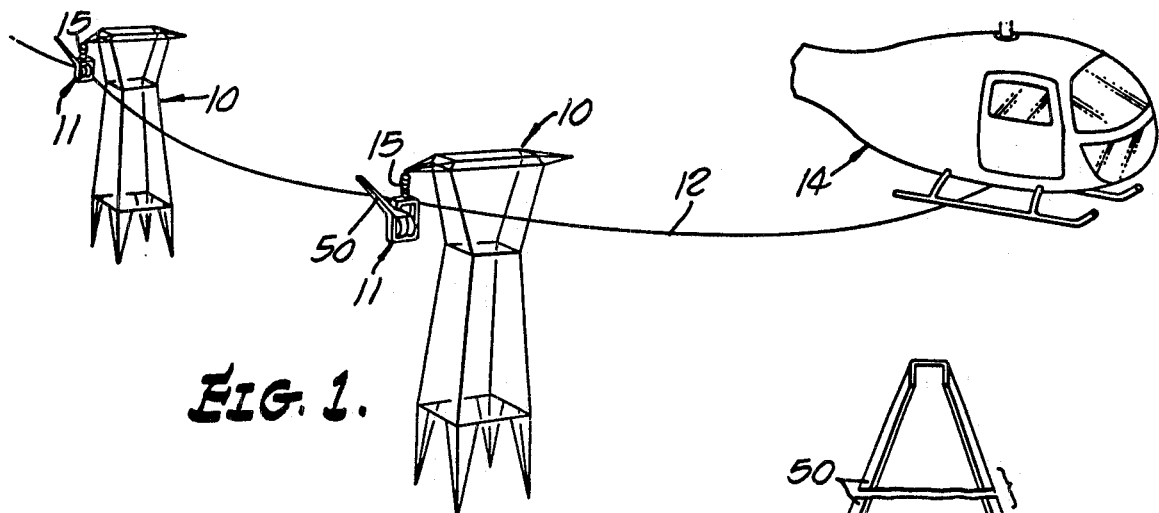
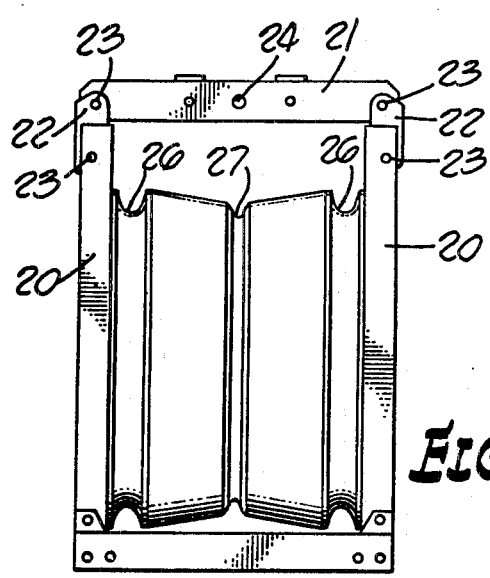
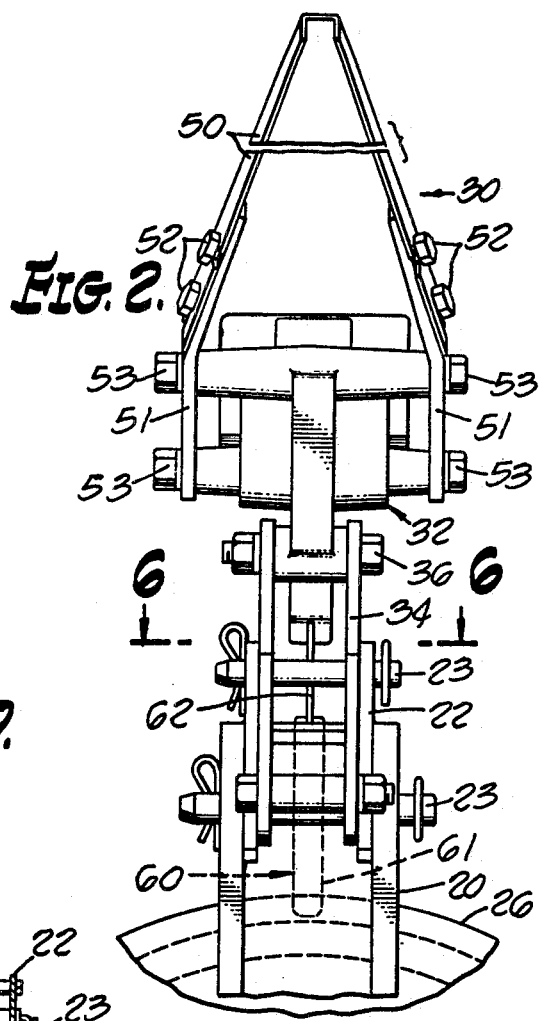
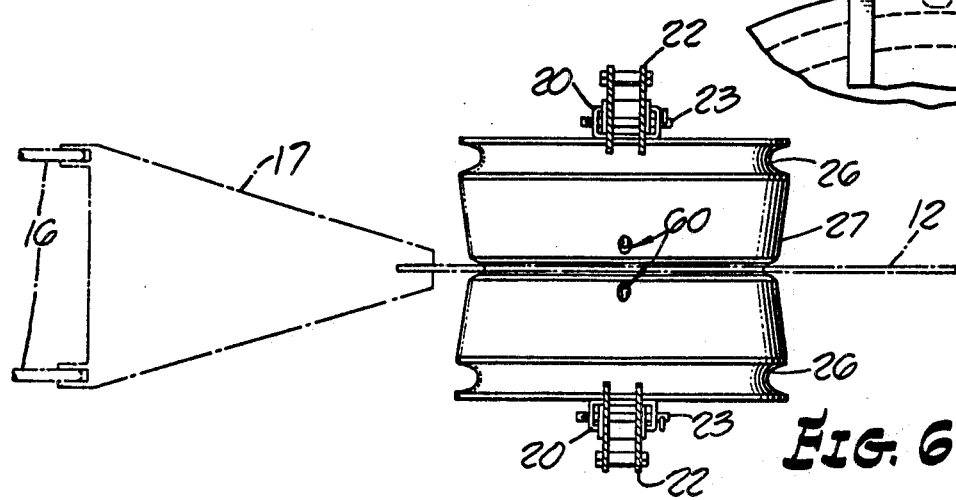

STRINGING BLOCK ASSEMBLY ADAPTED TO BE THREADED BY HELICOPTER

This application is a continuation of my application Ser. No. 282,430, filed Aug. 21, 1972, now abandoned, entitled "Stringing Block Assembly Adapted to be Threaded by Helicopter".

This invention relates to equipment for stringing powerline conductors, and more particularly to a bundle type power line stringing block adapted to be threaded with a hauling line by helicopter and to a suspension yoke securable to a stringing block in lieu of the conventional yoke to convert that block to threading by helicopter.

The installation of heavy duty power conductors along power lines necessitates the use of a special equipment and stringing blocks suspended from the lower end of each insulator. Owing to the size, weight and high tensile stresses required in the stringing operation, the stringing blocks must be designed for heavy loads and threaded with the conductor hauling line. One end of this line is usually connected to the conductors proper by a running board which is particularly desirable if a bundle type conductor is being installed. In this case a bundle type stringing block is necessary and the block must be properly designed to pass the running board and to maintain the hauling cable centered.

The threading operation is a laborious, time consuming operation requiring the workman to mount the tower and manually haul the end of the line into threading positions, the operation continuing from tower to tower until threading has been completed. Sherman U.S. Pat. No. 3,195,862 proposes a single sheave stringing block permitting the threading operation for smaller capacity single conductors to be performed by a helicopter flying along the line into the block from one side. That block is unsuited for heavy duty applications because lacking any provision for handling bundle-type power conductors, or for distributing the load forces between the opposite sides of the main frame or for holding the hauling line captive on a center roller of the stringing block. A further deficiency of the prior art is the lack of any means for converting existing bundle-type stringing blocks to use with helicopter threading equipment.

By the present invention there is provided an improved stringing block yoke assembly designed for use with helicopter threading equipment. The improved yoke is so made that either the new yoke or a standard suspension yoke is usable selectively with a conventional bundle type stringing block. The new yoke includes a spring biased latch movable to a position passing the hauling line dropped by the helicopter and then restorable to its normal latched position enabling the yoke to distribute the load forces equally between the opposite sides of the block frame. The converter yoke includes a long upwardly inclined extension for guiding the hauling line into the threading passage and past the load distributing latch. The lower end of the threading passage or channel is provided with extensions, such as stiff leaf springs supported cantilever fashion from the opposite sides of the threading channels and flexible lengthwise of the power line to pass the running board and then restorable to a position aligned with the groove in the centering groove for the hauling line. In this way the hauling line is held securely captive in its sheave groove without interfering with the passage of the running board.

Accordingly, it is a primary object of the present invention to provide a stringing block converter yoke assembly designed for threading with a conductor hauling line by helicopter and including provision for distributing the load forces equally to the opposite sides of the stringing block.

Another object of the invention is the provision of a stringing block yoke assembly threadable by helicopter and readily attachable to conventional stringing blocks in lieu of a yoke lacking provision for helicopter threading.

Another object of the invention is the provision of a stringing block assembly designed for use with running boards to string bundle conductors and having provision for threading with a hauling line by helicopter.

Another object of the invention is the provision of a stringing block having a normally closed latch crosswise of a helicopter threading passage and designed to be opened by the hauling line during a helicopter threading operation.

Another object of the invention is the provision of the stringing block assembly having a hauling line threading passage through the suspension yoke inclined to the horizontal with its lower end extending downwardly and formed by a pair of extensions cooperating with a hauling line sheave groove to hold the line captive but movable lengthwise of the line to permit passage of a running board.

Another object of the invention is the provision of a stringing block for cabling designed for threading by helicopter and having a downwardly inclined sinuous threading passage for a cable hauling line.

These and other more specific objects will appear upon reading the following specification and claims and upon considering in connection therewith the attached drawing to which they relate.

Referring now to the drawing in which a preferred embodiment of the invention is illustrated:

FIG. 1 is a general perspective view of a power line having one embodiment of the invention stringing blocks supported from the towers and in the process of being threaded by a helicopter;

FIG. 2 is a fragmentary end elevational view on an enlarged scale of a stringing block equipped with the invention suspension yoke shown in FIG. 1;

FIG. 6 is a cross-sectional view on a reduced scale taken along line 6—6 on FIG. 2; and FIG. 7 is a front elevational view of a bundle conductor stringing block having a conventional suspension yoke of a type readily usable in lieu of the helicopter threadable yoke.

Figure 3:
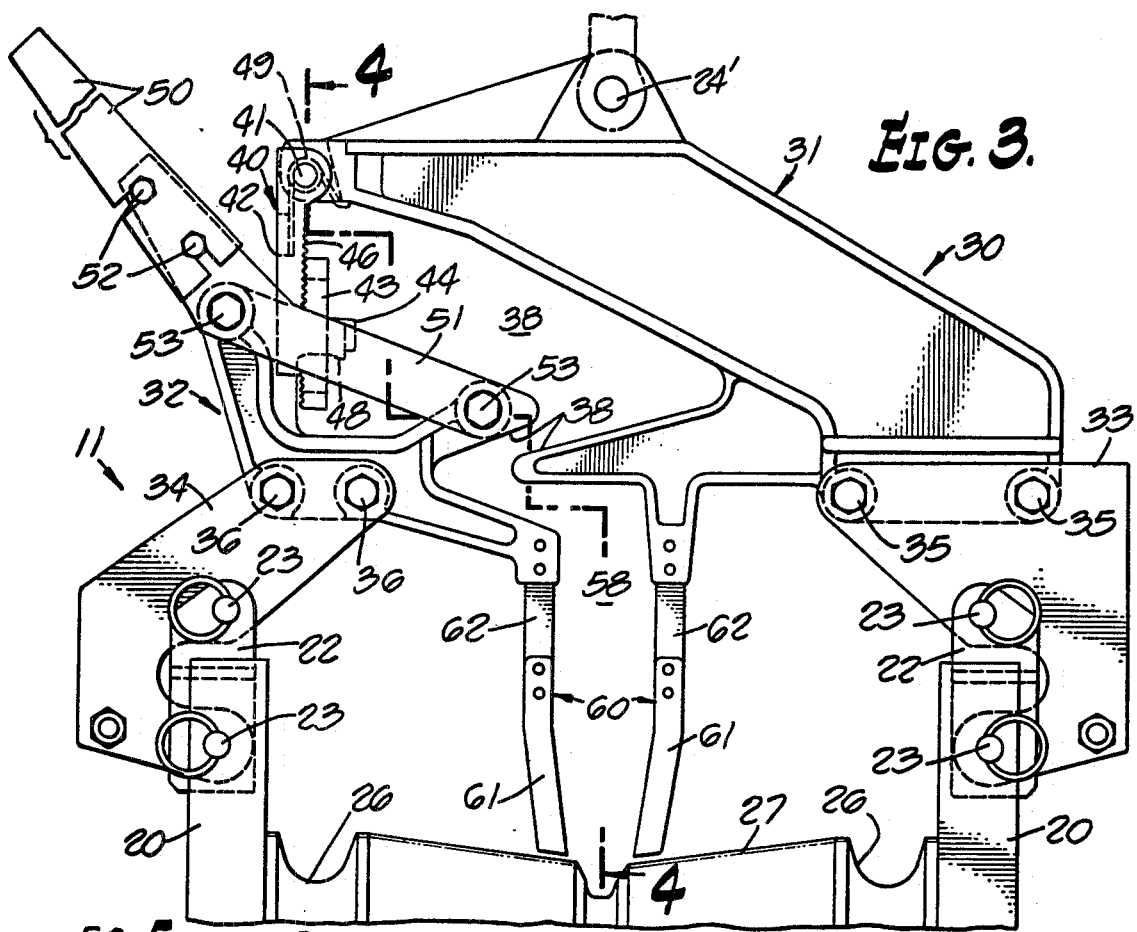
FIG. 3 is a corresponding front elevational view of the yoke assembly as viewed from the right hand side of FIG. 2.

Referring initially to FIG. 1, there is shown a power line having conductor supporting towers 10,10 spaced at intervals and in the process of having the conductor stringing blocks 11,11 threaded with a conductor hauling line 12 attached to a helicopter and dispensed from a reel not shown and preferably located at the far end of the line. In accordance with customary practice, the stringing blocks 11 are suspended from the lower ends of insulators 15 attached to supporting arms of towers 10. Following threading of the stringing blocks 11,11 with the hauling line, the remote end of the hauling line is attached to the bundle type power cables 16,16 (FIG. 6) by any suitable running board 17, the details of which are not illustrated but are well known to those skilled in this art. This running board holds the cables properly spaced apart to seat in the grooves of sheaves supported in each stringing block 11.

Referring to FIG. 7, there is shown a typical bundle type stringing block here shown by way of example as having a rigid U-shaped main frame 20 having the upper end of its upright legs interconnected by a detachable suspension yoke 21. It will be understood that this frame may comprise a pair of side frames and the sheave shaft suitably secured together. The upper ends of frame 20 are equipped with connectors 22,22 provided with openings to seat draw pins 23,23 the upper ones of which pass through and hold the yoke 21 detachably assembled to the remainder of the stringing block. An opening 24 through the mid portion of yoke 21 seats a clevis pin holding the stringing block suspended from the lower end of an insulator, such as insulator 15. Rotatably supported on a shaft journalled in the legs of frame 20 are a pair of conductor supporting sheaves 26,26 and a center sheave or roller 27 on which the conductor hauling line 12 is supported.

Referring now to FIGS. 2–5 there is shown a converter yoke, designated generally 30, which can be substituted for yoke 21, FIG. 7, to make possible threading the stringing block with a conductor hauling line by helicopter. As is best shown in FIG. 3, yoke 30 comprises two main castings 31,32 respectively attachable to a separate one of the legs of the main frame 20 of the stringing block. Since stringing blocks of the type shown in FIG. 7 differ somewhat in the width between the legs of the main frame, main castings 31,32 of yoke 30 are preferably equipped with adapters 33,34 detachably securable to the castings by bolts 35,36. The adapters are available in a range of different sizes as necessary to accommodate stringing block frames of differing widths and each is provided with holes adapted to seat the draw pins 23,23 chained to and previously used to hold yoke 21 to the block frame. Thus, it will be understood that a pair of adapters 33,34 of appropriate size for assembly to a particular size of a conventional stringing block is assembled to yoke castings 31,32

Figure 5:
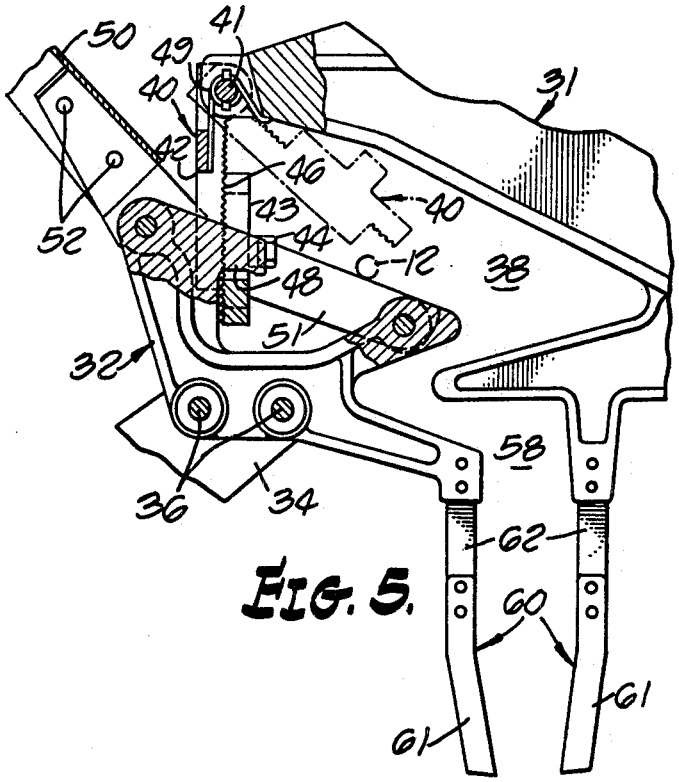
FIG. 5 is a cross-sectional view taken along line 5—5 on FIG. 4.

As is best illustrated in FIGS. 3 and 5, yoke members 31,32 of the stringing block frame are so contoured as to provide an inverted S-shaped threading passage 38 extending upwardly from immediately above the central sheave to the upper left hand corner of the assembly, as viewed in FIG. 3, where it is normally closed by the pivoted member 40. From the foregoing it will be recognized that passage 38 provides a pathway, with element 40 in open position, through the main frame of the stringing block assembly for the transfer of a running board hauling line from the exterior of the frame to the interior thereof. For this reason the main frame may be viewed as C-shaped, or as a split ring, and this is true whether the bight of the main frame comprises the sheave shaft, or the cross piece below the sheaves as shown in FIG. 7.

Figure 4:
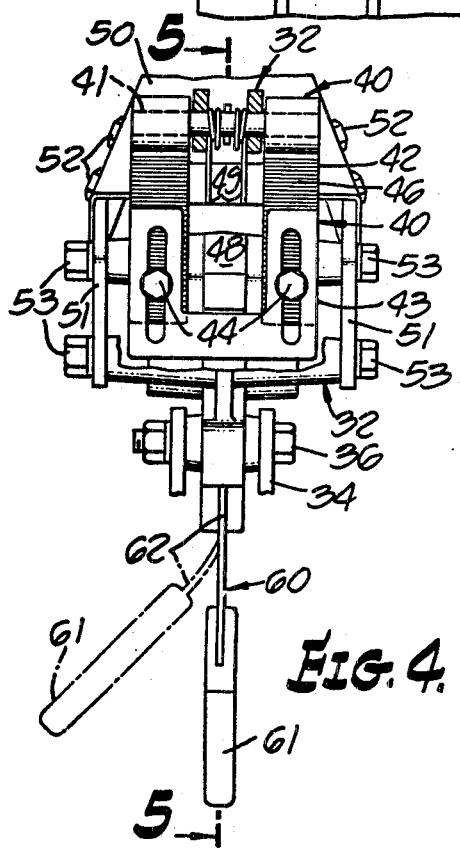
FIG. 4 is a fragmentary cross-sectional view taken generally along the broken line 4—4 on FIG. 3.

The sinuous S-shaped threading passage 38 not only aids in arresting and slowing the movement of the hauling line downwardly therealong but also acts to prevent reverse upwardly movement therealong after it passes out of the lower end of this passage. The upper or inlet end portion of the channel or passage 38 is normally closed by suitable closure means as, for example, a strong load transfer means, keeper or latch member 40 pivoted to yoke member 31 on a pivot pin 41. Load transfer means 40 comprises two oppositely directed U-shaped members 42,43 the legs of which are held adjustably clamped together by a pair of clamping cap screws 44 (FIG. 4). The adjacent faces of their legs are ribbed transversely thereof as indicated at 46 to avoid any possibility of the latch members becoming displaced from a desired adjusted position. The adjustment between members 42 and 43 obtained as just described provides means for compensating for variations in manufacturing tolerances for reasons well known to those skilled in resolving manufacturing problems. The aligned rectangular opening provided by the two U-shaped members 42,43 enables the latch to pivot into and out of load transfer latching engagement with the finger-like latch detent 48 (FIG. 5) carried by yoke member 32. Latch 40 is normally held in its upright latched position illustrated in FIGS. 4 and 5 by a torsion spring 49, encircling the latch pivot pin 41. This spring is responsive to the weight and tension in the hauling line bearing against the left hand face of the latch, as viewed in FIG. 5, to pivot the latch counterclockwise to the extent necessary to permit passage of the hauling line 12 therepast and thence downwardly along threading passage 38. As soon as the hauling line passes the latch, spring 49 restores latch 40 to its latched position over detent 48. When in this normal position the latch is effective to transfer load forces between the two yoke members 31,32.

Projecting upwardly and outwardly from the upper end of the threading passage 38 is a guide horn 50 of channel-shape in cross section and formed from sheet metal or the like. Horn 50 is held assembled about the upper ends of a pair of straps 51,51 by cap screws 52, straps 51 being held assembled to yoke member 32 by bolts 53. As is best shown in FIG. 4, straps 51 are spaced outwardly to either side of latch 40.

Projecting downwardly from either lateral side of the outlet 58 of the threading passage 38 are a pair of flexible guards or fingers 60,60. These guard fingers assure the passage of the hauling line into and its retention in the seating groove 27 for the hauling line. These guard fingers include a lower rigid member 61 each preferably supported by a plurality of flexible spring strips 62 to permit the guard fingers to flex lengthwise of the power line but strongly resisting flexure in any other direction. Preferably each of the spring supports 62 includes a single member having both ends secured to the adjacent end of members 61, the other leaves of that spring assembly being unattached to member 61 but all the spring leaves being rigidly secured to one of the yoke members 31 or 32.

From the foregoing it will be recognized that the stringing block frame and yoke may be aptly described as a split ring with the threading passage 38 representing the split crosswise of an otherwise closed rigid loop or ring-like structure.

In use, if a cable is to be strung using conventional manual threading technique, then the stringing block is equipped with yoke 21 illustrated in FIG. 7 and supported from a clevis at the lower end of insulator 15 in the usual way. Threading is then carried out in known manner by crewmen passing the advance end of the hauling line in succession through the stringing blocks.

If the user wishes to thread the stringing block by helicopter he replaces yoke 21 with the two part converter yoke 30 illustrated in FIGS. 2–6, using the keeper-equipped draw pins 23,23 to hold the main castings of yoke 30 assembled to the upper ends of the U-shaped block frame. The block is then attached to the lower end of the insulator by clevis pin 24', care being exercised to assemble the block to the insulator with the hauling line guide horn 50 facing outwardly away from tower 10.

The helicopter pilot then flies down the power line while pulling the hauling line 12 and dropping it in succession onto horns 50 along which it gravitates into engagement with latch 40. The weight and tension of the line readily opens the latch automatically permitting the hauling line to bypass the latch and glide downwardly along the continuously inclined sinuous threading passage 38, through outlet 58 of this passage, and into the seating groove of the center sheave 27. After the line has bypassed latch 40, spring 49 automatically re-engages the latch beneath detent 48. In this connection it will be understood that the lower or adjustable U shaped latch member 43 is properly adjusted to barely swing free of the detent before any substantialyloading is imposed on the stringing block. Accordingly, the bight portion of the latch cooperates with detent 48 in response to elastic deflection of frame 20 to transfer load stresses between the free end of yoke member 31 and the underlying yoke member 32. It is for this reason that both sides of the block frame 20 assume an equal share of the load placed on the block during stringing operations.

After the hauling line has been pulled along the power line, its advance end is attached to power winch equipment and the line is used to haul the bundle conductors 16,16 into place. The running board 17 connecting the hauling line to the conductors readily passes by the guard fingers 60,60 which flex in the manner indicated in FIG. 4 permitting the running board to pass over the sheaves of a particular block.

While the particular stringing block assembly adapted to be threaded by helicopter herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. A suspension type power line stringing block assembly adapted to be helicopter-threaded with a conductor hauling line as in said hauling line is dispensed from a helicopter flying past said stringing block assembly, said stringing block assembly having main frame means rotatably supporting sheave means on horizontal axle means mounted on said frame means, said main frame means having a threading channel opening through the upper end portion thereof and disposed to receive a conductor hauling line as the latter is dispensed from a helicopter flying therepast, said main frame means including load transfer means having means extending crosswise of said channel and effective to transfer conductor stringing loads thereacross so that the portions of said main frame means to either lateral side of said sheave means cooperate in sharing the load carried by said sheave means while power line conductor means are being pulled therethrough, said load transfer means being actuatable by a helicopter-delivered conductor hauling line to permit the hauling line to move therepast onto the top side of said sheave means.

2. A stringing block assembly as defined in claim 1 characterized in that said load transfer means is movably supported on one side of said channel and is engageable with detent means supported on the other side of said channel.

3. A stringing block assembly as defined in claim 2 characterized in that said load transfer means comprises pivoting latch means, spring means normally effective to hold said latch means engaged with said detent means and responsive to tension forces acting on said hauling line delivered by helicopter into the inlet end of said channel to open and pass said hauling line before reclosing into engagement with said detent means.

4. A stringing block assembly as defined in claim 1 characterized in that said channel slopes downwardly from the upper inlet end thereof to a delivery position overlying the top of said sheave means.

5. A stringing block assembly as defined in claim 4 characterized in that said channel includes at least one reverse bend between the opposite ends thereof lying in a plane extending crosswise of said sheave means.

6. A stringing block assembly as defined in claim 5 characterized in that said channel is inclined downwardly relative to a horizontal plane substantially from end to end thereof with its lower end lying in a vertical plane generally centrally of said stringing block assembly.

7. A stringing block assembly as defined in claim 1 characterized in the provision of rigid means inclined upwardly and laterally from one side of said main frame means and from the upper outer end portion of said channel to support and guide a hauling line dropped thereonto from a helicopter into said channel for passage past said load transfer means.

8. A stringing block assembly as defined in claim 1 characterized in that said main frame means includes a U-shaped portion embracing said sheave means from below with the opposite ends of said axle means supported in the legs thereof, and split yoke means secured crosswise of the upper ends of the legs of said U-shaped frame portion, said split yoke means comprising a conductor hauling line threading passage inclined downwardly for delivering said hauling line by gravity onto the top of said sheave means.

9. A stringing block assembly as defined in claim 8 characterized in the provision of means for holding said split yoke means detachably assembled to the upper ends of the legs of said U-shaped frame portion.

10. A stringing block assembly as defined in claim 1 characterized in that said main frame means comprises a high-strength split ring wherein said split comprises said hauling line channel which opens upwardly and outwardly through one upper lateral quadrant of said split ring, and the other end of said channel opening downwardly toward the top central portion of said sheave means.

11. A stringing block assembly as defined in claim 1 characterized in that said sheave means has a plurality of grooves encircling the same including a central groove for a conductor hauling line and a groove to either side thereof to seat a respective conductor while being simultaneously pulled into position along a power line.

12. Suspension yoke means securable to the upper ends of the side frame members of a conventional multi-sheave hand-threaded stringing block to convert a conventional stringing block to use for threading with a conductor hauling line from a helicopter, said yoke means comprising first and second sub-units securable to the upper end of a respective one of the side frames of said conventional stringing block in an area spaced above and extending across the top of said sheaves with adjacent portions of said sub-units cooperating to provide a channel for the passage therealong of said helicopter-dispensed hauling line, said channel opening upwardly and outwardly at the inlet end thereof and downwardly toward a central one of said sheaves along the lower side of said yoke means, and hauling line guide means extending outwardly and upwardly from the lower side of the inlet end of said channel effective to receive a hauling line dropped by a helicopter and to transfer said line by gravity into said channel.

13. Yoke means as defined in claim 12 characterized in the provision of load transfer means movably supported crosswise of said hauling line channel with one portion thereof movably connected to said yoke means on one side of said channel and another portion thereof movably engaging the other side of said channel to transfer a load thereacross after a hauling line has passed through said channel after being dropped into said channel by a helicopter.

14. Yoke means as defined in claim 12 characterized in the provision of load transfer means having one end pivoted to said first sub-unit along one side of said channel and its other end engageable with detent means carried by said second sub-unit on the other side of said channel and cooperable therewith to distribute a load between said first and second sub-units when the latter are in use on the ends of the legs of a U-shaped stringing block frame.

15. Yoke means as defined in claim 14 characterized in that one of said two last named means includes adjustable means to compensate for variations in tolerance, said adjustable means permitting said load transfer means to open freely while being threaded with said conductor hauling line and being held closed when supporting the power line conductor.

16. Yoke means as defined in claim 12 characterized in the provision of normally engaged latch and detent means located on the opposite lateral sides of said channel, said latch means being readily movable out of engagement with said detent means before said yoke assembly is used to support a power line conductor and being held positively against opening when said yoke assembly is being used to support a power line conductor.

17. Yoke means as defined in claim 14 characterized in that said load transfer means is movable to permit passage of a hauling line therepast in only one direction.

18. Yoke means as defined in claim 12 characterized in that said channel is sinuous in shape so as to arrest the descent of the hauling line therealong after being dropped into the upper end of said channel from a helicopter.

19. A convertible power line stringing block usable selectively with a first split suspension yoke and with a second unitary suspension yoke and comprising in combination: a stringing block having a pair of upright main frame members supporting sheave means therebetween mounted on axle means having each of its ends secured to a respective one of said main frame members, a unitary first suspension yoke having means for securing the opposite ends thereof to the free upper ends of the legs of said main frame, a second split suspension yoke formed in two units having means for securing the same to a respective one of said main frame members in lieu of said first yoke and having their adjacent ends spaced apart to provide a guide channel for a hauling line which channel has an inlet end opening upwardly and outwardly to receive a conductor hauling line while being dropped by a helicopter, the lower end of said channel being positioned to deliver the hauling line downwardly onto the top central portion of said sheave means, and one of said first and second yokes being secured to the legs of said main frame members.

20. A convertible stringing block as defined in claim 19 characterized in the provision of hauling line guide means extending outwardly and upwardly from the inlet end of said hauling line guide channel effective to receive a helicopter-dropped hauling line and to guide the same along said channel and onto said sheave means.

21. A convertible stringing block as defined in claim 19 characterized in that the lower sides of each of said first and second suspension yokes, when assembled to said main frame members, are spaced sufficiently from said sheave means to accommodate the passage of a running board of a type commonly connecting the advance end of conductor means and a hauling line therefor.

22. A convertible stringing block as defined in claim 19 characterized in that said second split yoke is provided with load transfer means movably supported crosswise of said hauling line guide channel, said load transfer means being normally effective to transfer load stresses across said guide channel and being movable to permit a hauling line to move along said channel from the outermost end thereof and through the innermost end thereof.

23. A convertible stringing block as defined in claim 19 characterized in that the second suspension yoke is secured to the legs of said main frame members.

24. Suspension yoke means for supporting a multi-sheave power line stringing block from the lower end of a power line insulator while being threaded by helicopter with a conductor hauling line, said yoke means comprising first and second sub-units including means securable to the upper end of a respective side frame of a multi-sheave stringing block with the juxtaposed spaced-apart edges of said first and second sub-units cooperating to form a hauling line threading channel crosswise of said yoke means with its upper end facing outwardly and upwardly adjacent one end edge of said means to receive a hauling line from a helicopter and having an outlet at the lower end of said threading channel, one of said sub-units having a long extension projecting outwardly and upwardly from the lower side of said channel near the upper end thereof and serving to guide a hauling line into said channel as it is dropped from a helicopter onto said extension, and means for guiding the hauling line from said threading channel onto a sheave between a sheave to either side thereof.

25. Suspension yoke means as defined in claim 24 characterized in the provision of means extendable crosswise of said threading channel for releasably interconnecting said first and second sub-units after a hauling line has been dropped into said channel and passed therealong whereby said means is effective to transmit load forces between said first and second sub-units.

26. Suspension yoke means as defined in claim 24 characterized in the provision of a pair of extensions projecting downwardly from the opposite edges of the lower end of said threading channel and movable perpendicularly to a plane common to said extensions to permit running board means to be hauled past the lower side of said yoke assembly.

27. Suspension yoke means as defined in claim 22 characterized in that said pair of extensions comprise a pair of stiff spring leaf means having the upper ends thereof secured to the lower end edges of said channel for a hauling line.

28. Suspension yoke means as defined in claim 26 characterized in that said pair of extensions each include a plurality of leaf springs arranged face to face and secured together only at one end.

29. Suspension yoke means as defined in claim 26 characterized in that said pair of extensions each include an elongated rigid free end held assembled one to either side of the open lower end of said threading channel by a plurality of leaf springs arranged in parallel.

30. Suspension yoke means as defined in claim 24 characterized in that said first sub-unit has load transfer means movably supported along one edge of said threading channel and engageable with hook means on said second sub-unit near the other edge of said channel, said load transfer means being movable to permit passage of a hauling line therepast and being effective to interconnect said first and second sub-units to transfer load forces therebetween.

31. Suspension yoke means as defined in claim 24 characterized in a guide horn for a conductor hauling line and extending upwardly and outwardly from the upper end of said channel, said guide horn being formed in one piece and being relatively wide at the lower end thereof and merging with the lower side of the entrance end of said channel.

32. Suspension yoke means as defined in claim 24 characterized in the provision of adapters securable to each of said first and second sub-units and each having means for securing said adapters to the main frame of a stringing block of a different size than can be accommodated by said yoke means without said adapters.

33. A yoke assembly as defined in claim 24 characterized in the provision of load transfer means extending crosswise of said channel interconnecting said first and second sub-units and movable by a hauling line dropped by helicopter into said channel to a position permitting the hauling line to move past said load transfer means.

34. A yoke assembly as defined in claim 33 characterized in that said load transfer means is movably supported on said first sub-unit adjacent one edge of said channel and having load transfer engagement with means on said second sub-unit near the other edge of said channel, said load transfer means being movable to permit passage of a hauling line therepast and effective to transfer load forces between said first and second sub-units when said stringing block is in use to support powerline conductors.

35. A bundle-type stringing block assembly adapted to be helicopter-threaded with a conductor hauling line as it is dispensed from a helicopter, said assembly having a pair of side frames interconnected by a shaft supporting at least three sheaves and which side frames are provided with a threading passage through which the conductor hauling line passes onto a selected one of said sheaves, a guide horn projecting outwardly and upwardly from the lower side of the entrance end of said threading passage and effective to catch the hauling line as it is dropped from a helicopter, guide means supported on one of said side frames and extending to adjacent the rim edge of said selected sheave remote from said guide horn and cooperating to guide the hauling line onto said selected sheave, said guide means being substantially rigid in a direction tending to shift a hauling line from said selected sheave and past said guide means onto another of said sheaves but being movable in the plane of said selected sheave to permit a conductor running board to pass across the top of said sheaves and between said side frames in a direction normal to the axis of said shaft.

36. A stringing block assembly as defined in claim 35 characterized in the provision of guard means movably supported along one transverse edge of said threading passage and including means normally holding the same closed crosswise of said threading passage to hold a conductor hauling line captive within and between said side frames.

37. A stringing block assembly as defined in claim 35 characterized in that said threading passage extends upwardly and outwardly through one upper lateral corner of said stringing block assembly at an acute angle to the horizontal, and rigid guard means normally extending generally vertically crosswise of said threading passage to retain a hauling line captively threaded and including means permitting said means to move to a position to allow a hauling line to be threaded through said threading passage.

38. A stringing block assembly as defined in claim 35 characterized in that said threading passage includes means for guiding a hauling line through the entrance to said threading passage and thence along and only onto said selected sheave and for leaving the area immediately above all of said sheaves free for the passage of a running board conventionally interconnecting the trailing end of a conductor hauling line and the leading end of the conductor.

39. A bundle-type stringing block assembly adapted to be helicopter-threaded with a conductor hauling line dispensed from a helicopter, said assembly having a pair of rigid side frames secured to the opposite ends of a shaft supporting at least three sheaves side by side therebetween, one of said side frames being of inverted L-shape with one leg extending crosswise of and spaced from the peripheries of said sheaves and including means cooperating with the adjacent end of the other side frame to provide a hauling line threading passage having an exit end opening directly onto the top of a selected one only of said sheaves and an entrance end at the outer upper corner of said assembly, guide horn means for a conductor hauling line extending upwardly and outwardly from the lower side of said threading passage, and said threading passage including movable guide means projecting downwardly from said one leg of said one side frame toward one rim edge of said selected sheave to prevent the hauling line from being deposited in another one of said sheaves and for guiding the same onto the selected one of said sheaves.

40. A stringing block assembly as defined in claim 39 characterized in that said guide means includes resilient means for holding said guide means extended but permitting said guide means to move in a direction generally normal to a plane common to said side frames sufficiently to permit passage of a running board therepast.

41. A stringing block assembly as defined in claim 39 characterized in that said threading passage includes guard means movably supported crosswise of said threading passage adjacent the upper entrance end thereof and normally in closed position but movable to a position permitting movement of a conductor hauling line therepast.

42. A stringing block assembly as defined in claim 41 characterized in that said guard means is normally spring biased to said closed position and generally vertically across the entrance end of said threading passage.

43. A stringing block assembly as defined in claim 39 characterized in that said movable guide means is responsive to contact with running board means interconnecting the trailing end of a conductor hauling line and conductors being strung past said stringing block assembly to shift in whichever direction the hauling line is being pulled to permit passage of the running board past said stringing block assembly whereby said assembly can be employed on either side of a power line to string all conductors in the same direction therealong.

44. A stringing block assembly as defined in claim 39 characterized in that said movable guide means includes means restricting the same against movement in a vertical axial plane through said stringing block assembly while permitting movement thereof in either direction from and normal to the opposite sides of said vertical plane whereby said stringing block assembly is usable for helicopter threading and the stringing of conductors in the same direction along either side of a power line without need for making any adjustments or changes in said stringing block assembly.

45. A power line stringing block assembly adapted to be helicopter-threaded with a conductor hauling line as the hauling line is dispensed from a helicopter flying past the stringing block, said stringing block assembly having main frame means rotatably supporting sheave means on horizontal shaft means, said main frame means having a hauling line threading channel disposed to receive a conductor hauling line as the latter is dispensed from a helicopter flying therepast, the lower end of said channel and the adjacent portions of said main frame means being spaced above said sheave means sufficiently to pass a conductor running board therethrough, hauling line guard means secured to said main frame means and positioned between the lower end of said threading channel and the top side of said sheave means effective to guide the hauling line onto said sheave means and prevent lateral displacement thereof from the sheave means, and said hauling line guard guide means being responsive to contact with a running board to move to a position permitting passage of the running board therepast.

46. A stringing block assembly as defined in claim 45 characterized in that said hauling line guard means includes spring means effective to hold said guard means in position to guide a hauling line onto and retain same seated on said sheave means until said guard means is displaced and moved out of guarding position by contact with a running board.

47. A stringing block assembly as defined in claim 46 characterized in that said guide means comprise a pair of similar sub-assemblies having one end of each supported on said main frame means with the second end of each positioned closely adjacent a respective lateral edge of said sheave means, and said second ends being movable laterally away from a vertical plane parallel to said shaft means for said sheave means in response to the advance of a running board through said stringing block assembly.

48. A stringing block assembly having a main frame provided with a hauling line threading passage including guide horn means projecting outwardly and upwardly from the lower side of the upper outer end of said threading passage to receive a running board hauling line dispensed from an aircraft and to guide the line into said threading passage, and load transfer means movably supported crosswise of said threading passage and automatically operable upon contact with the hauling line as an incident to dropping the hauling line from a helicopter to prevent the escape of the hauling line therepast after it has been threaded through said threading passage.

49. An assembly as defined in claim 48 characterized in the provision of means for normally biasing said load transfer means to the closed position thereof.

50. A stringing block assembly having an open ended conductor hauling line threading passage adapted to be threaded by a hauling line dispensed from an aircraft, load transfer means movably supported crosswise of said threading passage and movable by a hauling line as the latter moves along said threading passage to effect movement of said load transfer means to a position blocking escape of the hauling line backwardly through said passage, and operable to transfer load stresses across said threading passage.

51. A stringing block suspension frame means for supporting a set of at least three power line stringing sheaves freely rotatable in side-by-side relation on a common shaft, said suspension frame means comprising first and second separate sub-units spanning the width of said plurality of sheaves and connectable one to either lateral side of said plurality of sheaves with the adjacent free ends of said sub-units cooperating to form a threading passage for a bundle conductor hauling line payed out from a helicopter, said threading passage having its inlet end opening outwardly and upwardly and its outlet end opening inwardly and downwardly and disposed to direct a hauling line by gravity onto an intermediate one of said set of sheaves, and hauling line keeper means movably supported on said first sub-unit and extending crosswise of said threading passage and including automatic means for permitting a hauling line to move therepast and onto said intermediate one of said sheaves and thereafter automatically blocking reverse movement of the hauling line out of the inlet end of said threading passage.

52. A stringing block suspension frame means as defined in claim 51 characterized in the provision of an elongated horn projecting outwardly and upwardly from the lower portion of the inlet end of said threading passage and effective to guide a hauling line into said threading passage as the line gravitates onto said horn.

53. A stringing block suspension frame means as defined in claim 51 characterized in that said threading passage includes means carried by one of said first and second sub-units for guiding a conductor hauling line through the outlet end of said threading passage and only onto said intermediate sheave.

54. A stringing block suspension frame means as defined in claim 51 characterized in that at least one of said first and second sub-units includes an adapter unit detachably assembled thereto and adapted to be used in lieu of an adapter unit of a different size thereby to permit use of said suspension frame with a set of sheaves of different design.

55. A stringing block suspension frame means as defined in claim 51 characterized in that said sub-units include a pair of side frames securable to a respective end of the sheave-supporting shaft, a pair of threading passage forming yoke units, and a pair of adapter units detachably interconnecting respective ones of said side frames and said yoke units, and said adapter units being readily substitutable for a pair of adapter units of different size thereby to render said suspension frame usable with a different size set of sheaves.

56. A stringing block suspension frame means as defined in claim 51 characterized in that said hauling line keeper means includes means normally engaged with detent means on said second sub-unit and effective to transfer load strains between said sub-units and crosswise of said threading passage.

57. A stringing block suspension frame means as defined in claim 51 characterized in the provision of hauling line guard devices movably supported by said suspension frame means, said guard device extending between the opposite sides of the outlet of said threading passage and a respective rim of said intermediate sheave and cooperating to guide said hauling line onto said intermediate sheave as it exits from said threading passage.

58. A stringing block suspension frame means as defined in claim 57 characterized in that said guard devices are movable to permit a bundle conductor running board to pass through the throat of the stringing block in either direction while stringing a bundle of conductors therethrough.

59. A stringing block assembly having main frame means supporting a plurality of sheaves and provided with a hauling line threading passage thereacross which passage is adapted to be threaded with a hauling line for a running board by an aircraft equipped with hauling line dispensing means, automatically operable load transfer means extending crosswise of said threading passage intermediate the opposite ends thereof and movably supported between the two sides of said threading passage, said load transfer means being automatically operable to permit passage of a hauling line therepast and onto a central one of said sheaves, and said load transfer means including means automatically cooperating with means carried by said main frame means on the opposite sides of said threading passage for transfering load forces across said threading passage.

60. A stringing block assembly as defined in claim 59 characterized in that said load transfer means is operable to prevent said hauling line from backward movement past said load transfer means and outwardly through the inlet end of said threading passage.

61. A stringing block assembly as defined in claim 59 characterized in that said load transfer means is constructed and arranged to permit movement of the hauling line along said threading passage only in one direction and is thereafter effective to prevent the hauling line from escaping backwardly along said threading passage.

62. A stringing block assembly as defined in claim 59 characterized in that said threading passage slopes generally downwardly from the outermost upper end thereof toward the innermost lower end thereof and toward the upper periphery of a central one of said sheaves.

63. A stringing block assembly as defined in claim 59 characterized in that said load transfer means is responsive to the weight and tension forces in the hauling line while in contact with said load transfer means to move said load transfer means to a position permitting the passage of the hauling line therepast toward a central one of said sheaves.

64. A stringing block assembly comprising a plurality of sheaves rotatably mounted on a supporting axle, a suspension frame having side members connected to the opposite ends of said axle; said side members defining the sides of a space above said sheaves, one of said side members including movable means adapted to be displaced by a conductor hauling line moving laterally from the exterior side of said frame and in to the space between said side members to enable said line to enter said space and rest upon one of said sheaves for use in pulling a conductor running board through said space and over said sheaves.

65. A stringing block assembly comprising a plurality of sheaves mounted on a shaft passing therethrough, suspension frame means connected to the opposite ends of said shaft and defining a space above said sheaves, said frame means including closure means normally preventing the travel of a conductor hauling line laterally of itself into said space but movable to a position enabling said hauling line to move laterally of itself and crosswise of said frame means from the exterior side thereof into said space, and guide means carried by said frame means to guide said hauling line onto a central one of said sheaves for use in pulling a conductor running board through said frame means and over said sheaves.

66. A stringing block assembly as defined in claim 65 characterized in that said closure means are pivoted on said frame means in the path of the hauling line when being transferred thereacross and displaceable by a pulling force present in a hauling line thereby to provide passage of the hauling line therepast to position above said sheaves.

67. A stringing block assembly as defined in claim 66 characterized in that said movable means is operable to permit movement of said hauling line therepast in one direction and to prevent retrograde movement of said hauling line therepast.

68. A stringing block assembly comprising means supporting more than two sheaves in closely spaced side-by-side relation for rotation about a common axis and including suspension frame means therefor portions of which extend upwardly along the exterior of the outermost ones of said sheaves and cooperating therewith to define a space above the sheaves adapted to receive a conductor hauling line, said frame means including movable means permitting a conductor hauling line to move laterally thereof and crosswise through one upwardly extending portion of said frame means from the exterior side thereof and into said space, and means mounted on said frame means for guiding the hauling line onto an intermediate one of said sheaves and for preventing the hauling line from thereafter shifting onto either outermost one of said sheaves.

* * * * *

UNITED STATES PATENT OFFICE
CERTIFICATE OF CORRECTION

Patent No. 4,129,287　　　　　　　　　　Dated December 12, 1978

Inventor(s) Keith E. Lindsey et al.

It is certified that error appears in the above-identified patent and that said Letters Patent are hereby corrected as shown below:

Column 5, line 50, delete "in".

Column 9, line 3, "22" should read -- 26 --.

Signed and Sealed this

First Day of January 1980

[SEAL]

Attest:

SIDNEY A. DIAMOND

Attesting Officer　　　Commissioner of Patents and Trademarks